> United States Patent Office 3,456,298
Patented July 22, 1969

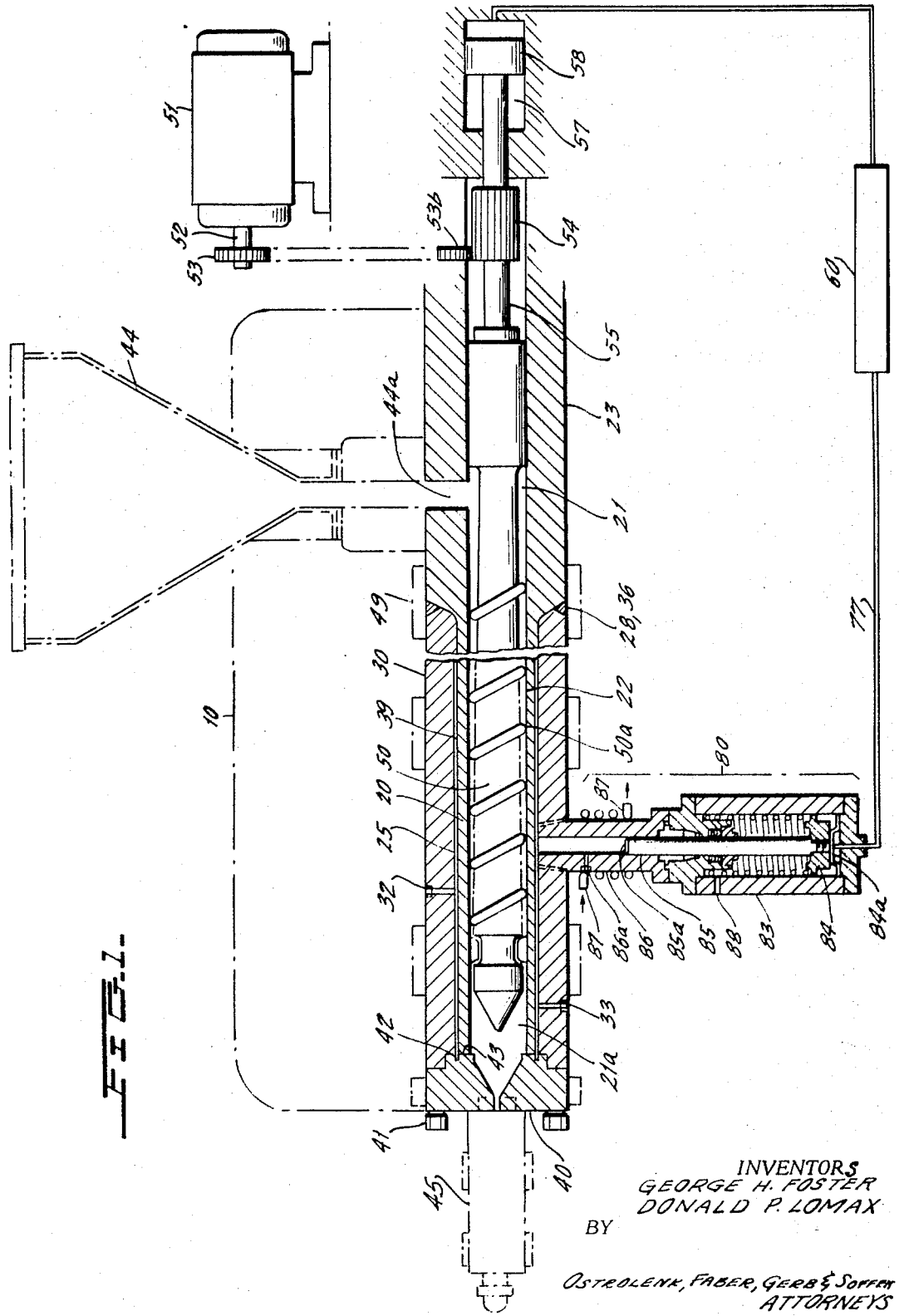

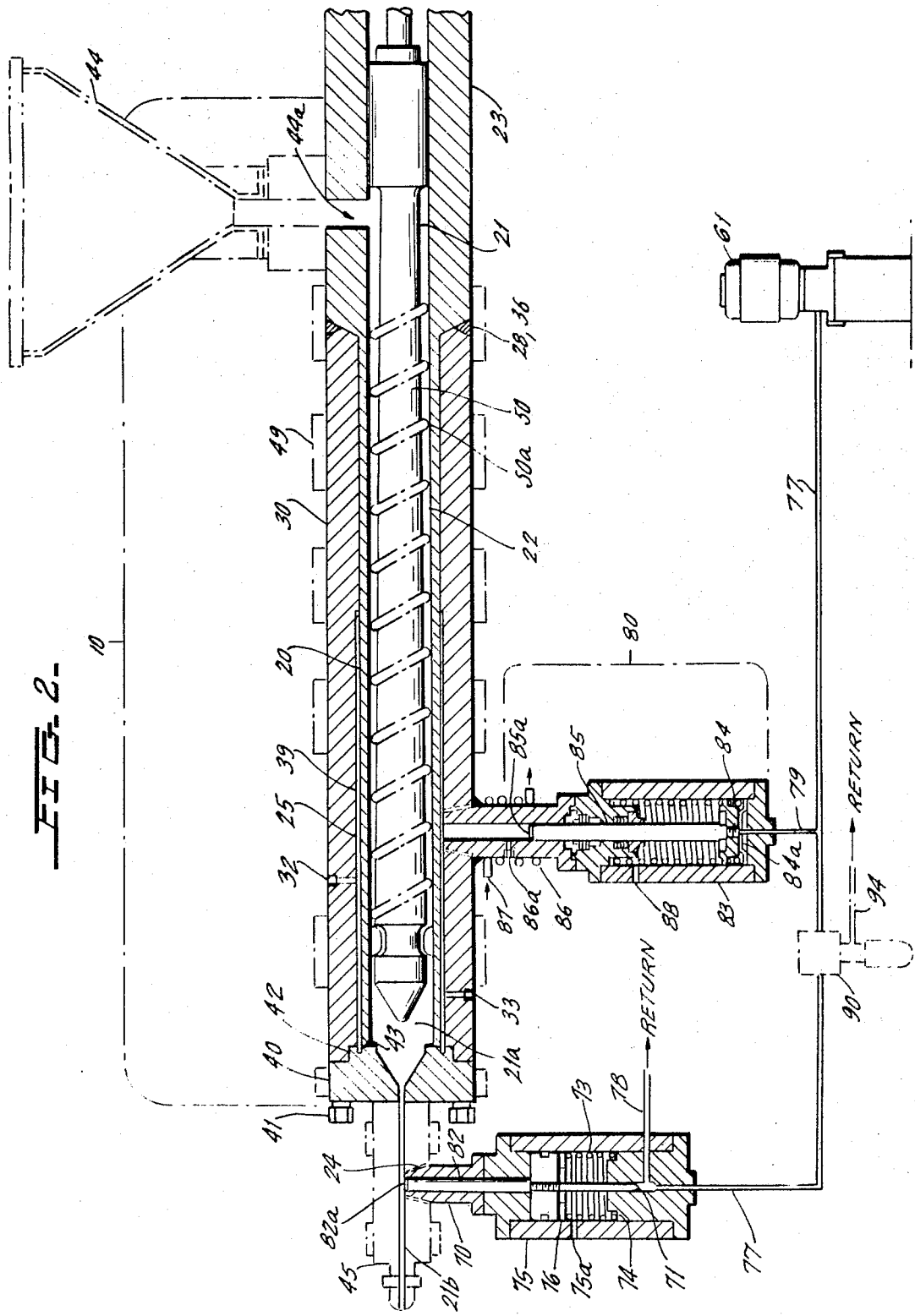

3,456,298
PRESSURE BALANCING MEANS FOR CYLINDERS
FOR INJECTION MOLDING AND EXTRUSION
George H. Foster, Westfield, and Donald P. Lomax, East
Brunswick, N.J., assignors to Xaloy Incorporated
Filed Jan. 18, 1967, Ser. No. 610,085
Int. Cl. B29f 1/02, 1/08, 3/02
U.S. Cl. 18—30                                    10 Claims

ABSTRACT OF THE DISCLOSURE

A ductile metal hollow cylinder lined with a relatively nonductile liner; plastic to be molded or extruded being placed under pressure within said cylinder, an outer hollow metal casing surrounding said cylinder and a fluid filled annulus between said casing and said cylinder, means for keeping the fluid at a pressure substantially equal to that within the cylinder.

---

This invention relates to hollow bimetallic cylinders for injection molding and extrusion of plastic materials and, more particularly, to a pressure balancing means for preventing distortion and possible rupture of the bimetallic cylinder wall.

Extrusion and injection molding cylinders having an end cap or adapter at one end and a piston and screw means moving through the cylinder toward the end cap develop tremendous internal pressures as the plastic material is pressed through the cylinder and the end cap.

For reasons fully discussed in copending U.S. applications Ser. Nos. 342,762, 485,918, and 414,443, plastics extrusion and injection molding cylinders are sometimes lined or treated with the metallic materials and coatings recited in those applications to provide wear and abrasion resistant surfaces.

The ductility of steel, which forms the main body of the cylinder, is much greater than that of the lining materials, e.g., 1020 steel can stretch 31.4% before rupturing, while certain of the linings may stretch only about ⅓ of 1% before rupturing. Therefore, internal pressures in the cylinders, which stretch their steel casing without rupturing them, may still cause the internal linings to rupture. To forestall rupturing, flaking, spoiling, or destruction of the lining, the walls of prior steel cylinders have been made much thicker and of a higher tensile strength steel to minimize distortion and stretching of the cylinder. This has undesirably increased the cost and the weight of the cylinders and has not been effective to prevent rupturing of the lining at pressures of about 20,000 p.s.i. and above.

The present invention is designed to overcome these difficulties by providing a pressure balancing means for providing a counterpressure, outside of and adjacent the inner wall of the cylinder, which counterpressure is substantially equal to the pressure within the cylinder. This makes it possible to reduce the thickness and cost of bimetallic cylinder walls and permits plastic molding operations to be performed in thin walled bimetallic cylinders operating at pressures up to 50,000 p.s.i.

The invention contemplates the provision of a thin-walled hollow steel cylinder having a lining of a hard abrasion resistant metal alloy. The cylinder is surrounded by a hollow cylindrical annulus which is, in turn, defined by another hollow relatively thin-walled steel cylinder or casing which surrounds the annulus. A fluid, having heat transfer properties similar to that of steel, is placed in the hollow annulus. Pressure balancing means are employed which keep the pressure of the fluid in the annulus approximately equal to the pressure within the hollow bimetallic cylinder so that the only forces being exerted on the outer and lined inner surfaces of the internal steel cylinder are compressive forces which would not cause stretching or distortion of the steel cylinder or its lining and, hence, would preclude rupture of the lining and the cylinder.

Only the outer steel casing around the inner lined cylinder may stretch due to the outward pressure of the fluid in the annulus. The steel body thereof is ductile and designed to be stretched without rupturing. Since variation in dimension of the outer steel casing has no effect on the inner wall dimension, no deleterious effect on operations is caused by such variation. Hence, the overall weight of the injection molding or extrusion cylinder can be reduced while the operative cylinder pressure can be increased without increasing the likelihood of deflection, distortion, variation in dimension or rupture of the liner.

As a further feature of the invention, since the plastic material is compressed toward one end of the cylinder bore, the pressure balancing means comprises a pressure sensing device that senses a bore pressure near the first end thereof.

As an additional feature, the pressure balancing means serves as an isolator preventing the escape of or contamination of both the plastic being molded in the bore and the expensive fluid in the annular chamber.

Accordingly, it is a primary object of the present invention to provide a pressure balancing means for a bimetallic cylinder for injection molding and extrusion of plastic materials, wherein the cylinder has a lining of a hard abrasion resistant alloy material, so that the cylinder will not deflect, distort, vary in dimension, or rupture under high operative pressures.

It is a further object of the present invention to provide such a pressure balancing means which permits a bimetallic cylinder to be employed without deflection, distortion, variation in dimension, or rupture at pressures up to 50,000 p.s.i.

Another object of the present invention is to provide such a pressure balancing means which will minimize the elongation of and stress upon the alloy lining of the lined bimetallic cylinder.

Another object of the present invention is to provide such a pressure balancing means which permits employing a bimetallic cylinder having smaller wall thickness than would otherwise be possible and, hence, having lighter weight, lower cost, and more favorable heat transfer characteristics.

It is another object of the present invention to provide such a pressure balancing means which precludes the necessity of restricting the choice of materials of which the cylinder casing may be constructed to materials which stretch only a minimal amount.

It is another object of the present invention to provide such a pressure balancing means which employs a fluid medium surrounding an internal alloy lined cylinder to prevent deflection, distortion, variation in dimension or rupture of the cylinder lining.

It is another object of the present invention to provide such a pressure balancing means which senses pressure in the vicinity of the cylinder or molding nozzle at the point of application of maximum pressure and responds to such variations in order to provide appropriate counterbalancing pressure.

It is a further object of the present invention to provide such a pressure balancing means which serves to isolate the fluid medium surrounding the internal cylinder and to isolate the plastic being molded from escaping from the pressure balancing means and the cylinder bore or from being contaminated.

These and other objects of the present invention will become apparent after the following description is read in conjunction with the accompanying drawings in which:

FIGURE 1 schematically illustrates a longitudinal section through an injection molding screw unit, as attached to a hydraulically activated screw, having one embodiment of a pressure balancing means in accordance with the present invention.

FIGURE 2 schematically illustrates a longitudinal section through an injection molding screw unit, as attached to an electrically operated screw, having a second embodiment of a pressure balancing means of the instant invention.

Referring to FIGURES 1 and 2 the composite bimetallic cylinder 10 comprises an internal cylinder 20, outer casing 30, end cap 40 and molding nozzle 45. Internal cylinder 20 is hollow, having a bore 21 therethrough and having relatively thin walls. It is formed of a ductile metal, such as steel, and preferably of a steel having a trade designation of ASTM 1020 steel.

Cylinder 20 is a lesser diameter extension of barrel 23. Casing 30 and barrel 23 are provided with respective meeting and mating surfaces 36 and 28, which are secured together. Casing 30 is spaced from cylinder 20 and thereby defines the annular cylindrical chamber 39 between the outer surface of cylinder 20 and the inner surface of casing 30.

By this means, a composite molding barrel is formed having a relatively thin inner cylinder 20 defining the bore 21, a pressure fluid containing annular cylindrical chamber 39 and an outer casing 30.

Cylinder 20 is provided with an internal abrasion resistant coating or liner 22 which is, as noted above, comprised of a relatively inflexible and inelastic material and which is made in accordance with the U.S. patent applications previously referred to. Hence, variation in dimension or flexing of cylinder 20 will tend to destroy the coating or liner.

The end cap or adapter 40, is secured to the forward or free end of the composite casing 30 and cylinder 20 by, e.g., bolts 41. Bolts 41 should be torqued so as to create a tight metal to metal seal between surfaces 42 and 43.

A hopper 44 is provided into which the material to be molded, extruded or injected is placed. The material enters the bore 21 of cylinder 20 through hopper opening 44a (FIGS. 1 and 2) and is forced through the end cap 40 by the hereinbelow described means for moving plastic material toward end cap 40.

Where the end cap 40 is the initial portion of an injection element, the pressures that may develop in the portion 21a of the cylinder bore 21 adjacent the end cap, i.e., the portion in front of the hereinafter described auger or screw 50 which decreases in volume as the auger moves toward end cap 40, may reach 50,000 p.s.i.

The invention contemplates the utilization of a pressure fluid in the annular cylindrical chamber 39 which chamber surrounds the cylinder 20 along the portion of its length where maximum pressures will obtain.

It should, therefore, be noted that at all locations where the pressure within bore 21 might be sufficient to distort or damage the lining 22 of cylinder 20, the cylinder 20 is surrounded by the annular chamber 39, which contains a fluid that is kept at a pressure which counteracts the effect of the pressure within the bore 21. The annular chamber is uniform around the cylinder 20, so that a uniform pressure is applied over the whole external surface 25 of cylinder 20 to avoid stress at individual points.

A pressure balancing means, described below, is provided which is capable of sustaining the same pressure in annular chamber 39 as the pressure developed within the portion 21a of cylinder bore 21 to thereby maintain a balance of pressure on the inner and outer walls of cylinder 20. This ensures that the cylinder 20 will not stretch or deflect and prevents the liner 22 from stretching and thereby prevents its rupturing, flaking or spoiling.

By means of chamber 39 and the pressure balancing means, the pressures are transmitted to the outer casing 30, which is made sufficiently thick and strong as to prevent stretching or flexing beyond its elastic limit and to prevent its rupturing, casing 30 is comprised of a material, such as steel, that may deflect or vary in dimension and even distort under the incidence of pressures without being damaged. Casing 30 has only the function of containing the pressure. It may expand, flex or change dimension without any resultant change in the dimensions of cylinder 20 or damage to the coating or liner 22.

Employing a pressure balancing annulus 39 between the lined bimetallic cylinder 20 and the casing 30 enables the completed barrel to be smaller in its outer diameter for the same operative bore diameter than conventional single thickness barrels for molding. This is because a single thickness of material surrounding the bore, which is capable of withstanding and remaining dimensionally stable under all expected pressure conditions, need no longer be used.

Both heat transfer through the cylinder 20 and casing 30 and uniform heat distribution through the barrel are important.

Hence, any pressurized fluid in the annular chamber 39 must possess a heat transfer coefficient similar to that of the steel of which cylinder 20 and casing 30 are comprised. In addition, the annular chamber fluid must be able to operate effectively at high pressures and temperatures of about 700° F. Suggested materials for the fluid in the annular chamber 39 are liquid potassium, or a fluid designated in the trade as Dow Corning XF-1-018, or an equivalent fluid.

Casing 30 has one or more pipe taps 32 and 33. The pipe taps pass from outside casing 30 into annular chamber 39 and permit entry of pressure balancing fluid. Connecting the pipe taps at different positions provides a simple means for adding, circulating and removing annulus fluid more uniformly throughout the annular chamber.

In each embodiment of the present invention the insertion of plastic material to be compressed toward the molding nozzle 45 and therethrough, and means for compressing and forcing the plastic material through bore 21 of cylinder 20 and through end cap 40 is well known in the art, and is shown here for illustration.

Both figures ilustrate a typical injection molding screw used in connection with the instant invention. A charge of plastic material to be molded is inserted into the bore 21 through opening 44a in the barrel 23 and contacts auger or screw 50.

Reciprocating screw 50 operating in the bore of cylinder 20 is rotated around its longitudinal axis by well-known means, so that the screw vanes or flights 50a act as a conveyor to move the plastic material through the bore 21 of cylinder 20 and into the portion 21a of bore 21 beyond the free end of the screw and adjacent the molding head 40. The shaft of screw 50 is appropriately shaped, increasing in diameter toward the free end of the screw to compress the plastic material as it feeds the said material toward portion 21a of bore 21. The compressed material is forced into portion 21a until it is at as great a density therein as the screw feeding apparatus can create.

A heater band 49 surrounds casing 30 to keep the plastic in bore 21 at sufficiently elevated temperatures to permit molding under pressure to take place.

As shown in FIGURE 1, for this initial feeding operation, the screw 50 may be rotated by motor 51, which drives shaft 52, gear train 53, and gear 53b. Gear 53b engages gear 54 on shaft 55, which shaft is axial and integral with the shaft of screw 50. In this phase of compression, the screw need not be moved axially, as its rotation alone moves the plastic toward head 40.

Gear 54 may be extended axially so that it will be able to stay in engagement with gear 53b when shaft 55-50a is slid axially in a manner described below.

In the embodiment of FIGURE 1, after the screw flights 50a and the screw have delivered compressed material to the maximum extent possible, the entire screw is driven hydraulically toward end cap 40 to force the material through molding nozzle 45. The initial compression by the screw provides an initial internal pressure in portion 21a of bore 21; but the hydraulic movement of the screw to press the material creates pressures of a higher order—up to 50,000 p.s.i.

In the hydraulic operation of the screw 50 to produce its axial translation toward end cap 40, a cylinder 57 containing piston 58 is provided on the end of the screw shaft 55. The piston 58 is operated by an appropriate conventional hydraulic ram or pump 60 (shown schematically) which translates the screw 50 axially to further compress the already compressed plastic material in portion 21a of bore 21 and to place the material under sufficient pressure to force it through the molding head 40 and through subsequent mold feeding operations.

The fluid under pressure in the annular chamber 39 for the structure described in FIGURE 1 may come from the same source as that used for driving piston 58 of the screw 50-50a or may come from a different source. The essential element is the control of pressure in the chamber 39 in response to variation in pressure in cylinder bore portion 21a.

Various means may be utilized to sense the internal pressures within the bore 21 of cylinder 20 and to apply counterpressure to substantially the same degree in the annular pressure chamber 39.

The first embodiment of this invention (FIGURE 1) employs the same device or element which imposes pressure on screw 50 and thus on the plastic in bore 21 of cylinder 20, i.e., hydraulic pressure source 60, to impose the same pressure on the fluid in annular pressure chamber 39 as is applied on the plastic in portion 21a of bore 21.

The pressure needed to drive the piston of the screw 50 should be approximately one order of magnitude greater than the back pressure generated by the compression of material in cylinder portion 21a in order to cause screw 50 to move through portion 21a.

A pressure amplifying device 80 is provided having a piston 84 in cylinder 83 which is fixedly joined to a piston 85 in narrower cylinder 86. Fluid under pressure moves from source 60 through conduit 77 and pressure is applied to surface 84a of piston 84 which drives piston 85 further into cylinder 86 causing surface 85a of piston 85 to exert pressure on the fluid in chamber 39.

The proportioning of elemetns of the pressure amplifying device 80, particularly the area of surface 84a of the piston 84 and the area of surface 85a of the piston 85, will control the pressure in chamber 39 in accordance with the pressure needed to drive the screw 50 through cylinder portion 21a.

Pressure amplifying device 80 has an air bleed 88 above the piston 84. Thus, when piston 84 moves toward small cylinder 86, there will not be a buildup of air pressure beneath the piston 84 which might interfere with the calibration of the proper pressure compensation provided by the fluid in annular chamber 39.

Pressure amplifying device 80 serves to isolate the expensive fluid in the chamber 39 from the pressure fluid source and serves to preserve this fluid so that its purity is not contaminated and its volume is not reduced.

Small cylinder 86 has an inlet tap 86a through which fluid for the annular chamber 39 might be added or removed.

A coil 87 is wound about the upper portion of the exterior of small cylinder 86 and is used, at least in part, to control the temperature of the fluid in cylinder 86, passages 32, 33 and chamber 39. Coil 87 may be a pipe having a heat transfer fluid, e.g., water, at the desired initial temperature passing through it or it may be an electric resistance coil if, for any reason, an elevated temperature for the fluid in chamber 39 may be desired; or it may, if desired, be a massive coil or body of "heat-sink" metal.

A second embodiment of the pressure sensing device of the instant invention is shown in FIGURE 2 and may be used as a more positive and direct means of controlling source or control pressure.

This embodiment utilizes a pressure sensor inserted through opening 24 in molding nozzle 45. The sensor is a device which senses the internal pressure in bore 21b of molding nozzle 45, which coincides with the internal pressure in bore 21a of cylinder 20 at the high pressure end of the cylinder. The sensor uses this information to control the pressure in annular pressure chamber 39. The sensor comprises a pressure sensor rod 82 having a pressure responsive surface 82a connected to bore 21b of molding nozzle 45 adjacent the end cap 40 where the highest pressures within the bore 21 will be generated. Rod 82 extends into bore 21b through opening 24 of molding nozzle 45 and is provided with an appropriate fitting 70 to prevent leakage. Rod 82 is integral with valve 71 operating in valve seat 72. Rod 82 is held in its upper position and in the fully open position of valve 71 by compression spring 73. Spring 73 bears at its lowest end against the base 74 of spring housing 75 and, at its upper end, against adjustment nut 76 on rod 82. Spring 73 may be initially calibrated by operation of the adjustment nut 76 to permit movement of rod 82 downwardly to a degree matching the spring pressure. When the pressure in portion 21a of bore 21 exceeds that in annular chamber 39, the spring 73 will compress to permit valve 71 to seat fully in valve seat 72. At minimum preset pressure or when the pressure in chamber 39 is greater than that in bore 21b, the spring 83 will drive valve rod 82 to open valve 71 completely.

Valve housing 75 has an air bleed 75a so that when spring 73 is compressed, the only force being exerted upon nut 76 is that being provided by spring 73. No air will be trapped beneath nut 76 which would interfere with movement of the elements under the joint control of the pressure on surface 82a of rod 82 and of the spring 73.

A hydraulic fluid power unit 61 supplies hydraulic fluid under pressure to conduit 77. Fluid under pressure enters housing 75 through supply conduit 77 and, when valve 71 is completely opened, all the fluid is drained through return conduit 78. As the valve 71 begins and continues to close, the pressure fluid is divided between return conduit 78 and conduit 79, which latter conduit leads to the control member 80, which is identical in structure and function to pressure amplifying means 80 of the embodiment of FIGURE 1. The pressure fluid is proportionately divided in accordance with the degree to which valve 71 is closed. Should valve 71 close completely, all of the pressure fluid from the source 77 will flow to conduit 79. Conduit 79 is connected to cylinder 83 of control member 80 and the fluid under pressure in conduit 79 operates the piston 84 to move the pressure rod 85 in small cylinder 86.

The adjustment or setting of valve 71 to calibrate its response to the pressure on the surface 82a of rod 82 will determine the pressure which will be communicated to piston 84, to pressure rod 85 in small cylinder 86 and, therefore, to the fluid in annular chamber 39.

This pressure sensing device serves as an isolator to keep the fluids in the conduit 77 from entering bore 21b and to prevent the plastic in bore 21b from entering conduit 77.

A safety relief valve 90 may be provided between fluid pressure control device 80 and pressure conduit 77. On the occurrence of excess pressure in conduit 77 leading to cylinder 83, the relief valve 90 will open and return the hydraulic fluid through conduit 94 to its source of supply.

Thus, it will be seen that two basic elements are present in this embodiment of FIGURE 2:

(1) The pressure sensing means comprising rod 82 and its pressure receiving surface 82a in molding nozzle 45 to control the amount of pressure to be applied in the annular chamber 39 as a function of the variation in pressure in bore portions 21a and 21b.

(2) The fluid pressure control device 80 which serves both to amplify the incoming line pressure and to isolate the fluid pressure source from the expensive fluid utilized in chamber 39.

Very often, as noted above, the bimetallic cylinder of the instant invention is operated at very high pressures, e.g., 50,000 p.s.i. The conduits, e.g., 77, 78, 79 and 94 in FIGURE 2, which convey the fluid to and from the amplifier 80 and the valve 71, may have to extend a considerable distance to the pressure fluid source. Since it may be difficult and expensive to construct long and heavy conduits with sufficient strength to contain elevated pressures, a simple pressure amplification means is provided. The area of surface 71a of valve 71 can be made a multiple of the area of the surface 82a of rod 82. By making the area of surface 71a larger than that of surface 82a, the pressure of the fluid entering housing 75 from conduit 77 is multiplied by the ratio of the area of surface 71a to the area of surface 82a.

Similarly, piston 84 can be designed so that the area of its surface 84a can be a multiple of the area of surface 85a of piston pressure rod 85. The pressure of the fluid passing through conduits 77 and 79 will be multiplied by the ratio of the area of surface 84a to the area of surface 85a.

In order for the pressure balancing means of FIGURE 2 to operate properly, the ratio of the area of the surface 71a to the area of surface 82a should be the same as the ratio of the area of the surface 84a to that of the surface 85a. By the simple expedient of such a pressure amplification means, the conduits 77, 78, 79, and 94 may be light in weight and inexpensive, while permitting high operating pressures to exist in the bore 21 and annular chamber 39.

Although there has been described a preferred embodiment of this novel invention, many variations and modifications will now be apparent to those skilled in the art. Therefore, this invention is to be limited not only by the specific disclosure herein, but only by the appending claims.

The embodiments of the invention in which an exclusive privilege or property is claimed are defined as follows.

We claim:

1. In an apparatus for injection molding of plastic materials capable of operation at pressures up to 50,000 p.s.i.; said apparatus comprising a casing, a hollow cylindrical internal surface liner of a hard abrasion resistant alloy within said casing, said liner having an outside and an inside; a cylinder bore defined by the space surrounded by said liner; said bore having a first end out of which is passed plastic material being molded;

the improvement comprising a pressure balancing means to balance the pressure on said outside and said inside of said liner;

said pressure balancing means comprising a hollow annular chamber between said liner and said casing for holding a fluid, and a first mechanism comprising a first means connected with said annular chamber and a pressure sensing device; said pressure sensing device being connectable with said bore to sense the pressure in said first end of said bore;

said pressure sensing device being connected to said first means to balance the pressure between them.

2. In the apparatus for injection molding of plastic materials as claimed in claim 1 said apparatus further comprising a hollow cylinder; said liner being mounted inside said hollow cylinder; said cylinder being disposed within said casing;

the improvement further comprising said annular chamber being between said cylinder and said casing.

3. In combination, the apparatus of claim 1 and a means for moving plastic material through said bore toward said first end thereof;

said means for moving comprising a screw for moving plastic material toward said first end and a device for moving said screw toward said first end;

the improvement further comprising, said pressure sensing device being connected with said device for moving said screw, thereby to sense the pressure in said first end of said bore.

4. In the apparatus of claim 1, said bore having an end cap closing said first end of said bore; said end cap having a molding nozzle;

the improvement further comprising, said pressure sensing device being connected with said molding nozzle, thereby to sense the pressure in said first end of said bore.

5. In the apparatus of claim 4, the improvement further comprising, a first conduit means connectable to a source of fluid under pressure;

said pressure sensing device comprising a rod means having a first and a second end and comprising a first valve; said rod means being connected at said first end with said bore and being connected at said second end with a first valve; said first valve being connected with said first conduit means;

a pressure amplifier device; said pressure amplifier device comprising a piston means having a first and a second end; said piston means being connected at said first end with said annular chamber and at said second end with said first conduit means;

an outlet conduit from said pressure sensing device; said first valve being operable and positioned so as to block said outlet conduit when the pressure within said bore is greater than the pressure within said annular chamber.

6. In the apparatus of claim 5, the improvement further comprising, said pressure amplifier device and said pressure sensing device each having a pressure amplification means comprising, said first valve having a first surface area exposed to said first conduit means; said rod means having a second surface area exposed to said bore;

said piston means having a third surface area at its said second end exposed to said first conduit means and a fourth surface area at its said first end exposed to said annular chamber;

said surface areas being so chosen that the ratio of said first area to said second area is equal to the ratio of said third area to said fourth area.

7. In the apparatus of claim 6, the improvement further comprising, said first and said third areas being greater than said second and fourth areas.

8. In the apparatus of claim 3, the improvement further comprising, said pressure sensing device serving as an isolator to prevent fluid in said annular chamber from escaping therefrom and preventing other materials from entering said annular chamber.

9. In the apparatus of claim 6, the improvement further comprising, said pressure amplifier device serving as an isolator keeping fluids within said first conduit means from entering said annular chamber and keeping fluid within said chamber from entering said first conduit means.

10. In the apparatus of claim 6, the improvement further comprising, said pressure sensing device serving as an isolator keeping fluids within said first conduit means out of said bore and keeping materials within said bore out of said first conduit means.

References Cited

UNITED STATES PATENTS

| | | | |
|---|---|---|---|
| 2,747,224 | 5/1956 | Koch et al. | 18—2 X |
| 3,001,233 | 9/1961 | Ernst | 18—30 |
| 3,002,615 | 10/1961 | Lemelson | 18—2 X |
| 3,148,231 | 9/1964 | Spencer | 264—40 |
| 3,357,049 | 12/1967 | Spindler | 18—30 X |

WILBUR L. McBAY, Primary Examiner

U.S. Cl. X.R.

18—2, 12; 264—40